Patented June 21, 1938

2,121,399

UNITED STATES PATENT OFFICE 2,121,399

PROCESS FOR PRODUCTION OF ZINC SULPHATE

Ivan L. Haag, Cleveland, Ohio, assignor to E. I. du Pont de Nemours & Company, Wilmington, Del., a corporation of Delaware No Drawing. Application February 23, 1937, Serial No. 127,311

2 Claims. (Cl. 23—125)

This invention relates to processes for producing zinc sulphate, and is particularly directed to processes for producing zinc sulphate monohydrate having a basicity not greater than about 0.06% as zinc oxide and having a lower ratio of chloride to zinc than the zinc-containing crudes from which it was produced.

Zinc sulphate is commonly made by dissolving various zinc-containing crudes in sulphuric acid, filtering or settling the zinc sulphate solution thus formed to remove acid-insoluble matter, concentrating the solution by evaporation, crystallizing out a crop of zinc sulphate, and returning the mother liquor to the process. Crudes of various compositions may be used as the starting point in this process. Any chloride contained in the crudes, being water-soluble, is carried through and appears as an impurity in the final product.

A zinc sulphate containing considerable amounts of chlorides is unfit for many important uses. Crudes containing large amounts of chlorides accordingly have not been applicable heretofore to the production of zinc sulphate unless expensive purification procedures were first applied.

The methods commonly used for making zinc sulphate monohydrate have heretofore resulted in the production of a basic crystal containing as much as 0.3% or more of basicity, calculated as zinc oxide. The basicity of zinc sulphate monohydrate must be kept below about 0.06% if a completely water-soluble product is to be obtained, since higher basicities give turbid solutions. It is necessary in many instances to acidify the solution and clear up any such turbidity before the solution can be used.

A neutral or slightly acidic zinc sulphate solution is usually employed when zinc sulphate monohydrate is produced by the processes heretofore known to the art. I have observed that even though the solution is slightly acidic, the monohydrate crystal thrown out by concentrating is definitely basic. As this basic crystal is taken out, the acidity of the solution builds up. Eventually the solution becomes sufficiently acidic to give a neutral crystal. The product is therefore a heterogeneous mixture of crystals of varying basicity.

It is an object of my invention to provide a process for preparing zinc sulphate having a substantially lower ratio of chloride to zinc than the zinc-containing crudes from which it was produced. Another object is to prepare a zinc sulphate monohydrate having a basicity of less than about 0.06%, calculated as zinc oxide. These and other objects will more clearly appear as the description develops.

I have found that a zinc sulphate monohydrate having a uniform basicity not exceeding about 0.06% can be produced from a zinc sulphate solution if the acidity of the solution is maintained at from about 1% to about 2% as sulphuric acid during concentration, and if the zinc sulphate crystal is separated and dried together with from about 15 to 30% of its weight of the saturated mother liquor. I have also found that under these conditions a product having a lower ratio of chloride to zinc than the original zinc sulphate solution is produced.

By the processes of my invention I am able to produce a zinc sulphate of relatively low chloride content from a zinc crude containing substantial amounts of chloride without the necessity of costly preliminary purification. By virtue of its lower chloride content the crystal produced by my novel processes has a much broader field of usefulness than crystal produced from the same crude by methods heretofore available.

Zinc sulphate monohydrate prepared by the processes of my invention has a uniform basicity which does not exceed about 0.06%, expressed as zinc oxide. Hence, it is entirely water-soluble and is not subject to the disadvantages of the turbidity which is encountered with products of higher basicity such as were produced by processes formerly employed.

The following examples illustrate the nature of my invention and its manner of application. It is to be understood, however, that the application of my invention is not limited to the particular conditions shown in these examples.

The loss of chloride during concentration of a zinc sulphate solution according to a process of my invention is shown in the following example.

*Example I*

A zinc sulphate liquor saturated at about 103° C. was made up containing about 46% zinc sulphate monohydrate, 1.2% acidity as sulphuric acid, and 0.8% chlorides as chlorine. One thousand (1000) grams of this liquor was heated to boiling and 1100 grams of water containing 1.6 grams of chlorine as zinc chloride was added at such a rate that the total volume remained constant because of evaporation. The amount of water evaporated was therefore equivalent to that which would have been evaporated in producing an average crop of crystals by concentrating a zinc sulphate liquor obtained by dissolving zinc crudes in sulphuric acid. The chloride content of the water added was equivalent to the chloride content of a zinc sulphate liquor made from an average zinc crude. The amount of chloride as Cl put into the solution of this example was therefore 8.75 grams initially present plus 1.6 grams added with the water, or a total of 10.35 grams. Chemical analysis of the solution after evaporation showed it to contain 9.71 grams of chloride as Cl, so that (10.35—9.71) or 0.64 gram of Cl was lost during evaporation, the chloride loss representing about 40% of the chloride added.

The manner of making the chloride addition in Example I simulated the feeding of a zinc sulphate liquor containing chloride to a concentrator such as is used in commercial practice, as for instance, a salt lock evaporator; consequently, the loss of 40% of the chloride added under the conditions of this example indicates that a substantial reduction can be effected in the chloride content of zinc sulphate feed liquors by the practical application of my novel processes.

The production of zinc sulphate monohydrate crystal of low basicity and chloride content by a process of my invention is shown in the following example:

Example II

A charge consisting of 995 pounds of a saturated zinc sulphate solution containing 17.32 pounds (1.74%) of chloride as Cl and 14.03 pounds (1.41%) of acid as $H_2SO_4$ was heated to boiling in a cone-bottomed tank. This charge of saturated liquor was mother liquor from which several crops of zinc sulphate crystals had already been taken in the manner of this example. To this boiling liquor was added 1050 pounds of a fresh neutral zinc sulphate liquor containing 0.84 pound (0.08%) of chloride as Cl, the rate of addition being slow enough so that a decrease in the total volume of the solution was effected by evaporation of water during the addition. Evaporation was continued until a substantial crop of crystals had been thrown out. This crystal crop was separated from the mother liquor through a salt lock connected to the coned bottom of the tank. By means of a centrifuge most of the adhering mother liquor was removed from the crystals and returned to the tank. In this manner 514 pounds of wet crystals and 736 pounds of mother liquor were obtained. Chemical analyses showed that the mother liquor contained 14.08 pounds (1.91%) of chloride as Cl, and 10.37 pounds (1.41%) of acid as $H_2SO_4$. The wet crystal contained 3.0 pounds (0.57%) of chloride as Cl. During concentration, therefore, the total chloride present was reduced 1.08 pounds, or more than the amount (0.84 pound) added with the feed liquor.

The wet crystals after centrifuging still retained almost 27% of their weight of mother liquor. The crystals were therefore dried in an oven to give a free-flowing product. The weight of dried crystals thus obtained was 454 pounds. Chemical analysis showed that the dried product contained only 1.55 pounds (0.34%) of chloride as Cl. A substantial further reduction of chloride content had therefore taken place during the drying operation.

The combined original mother liquor and feed liquor had a total zinc content of about 328 pounds and a total chlorine content of 18.16 pounds. The initial chlorine to zinc ratio was therefore 18.16 to 328 or 0.0553 to 1. The combined dry crystal and final mother liquor had the same zinc content, 328 pounds, but a chlorine content of 15.63 pounds. The final chlorine to zinc ratio was therefore 15.63 to 328 or 0.0447 to 1. A reduction of about 20% in the chlorine zinc ratio had therefore been effected.

Analysis showed that the basicity of the product was only 0.035% as ZnO, and tests proved it to be completely water-soluble.

A product having low basicity and reduced chloride content may be obtained according to the processes of my invention under conditions differing considerably from those illustrated in Example II.

In Example II the acidity of the solution is maintained substantially constant by the gradual addition of fresh neutral zinc sulphate. It will be evident, however, that my invention is not limited to this expedient, but rather that any of the known methods by which excess acid is neutralized to a harmless salt may be employed to prevent the gradual increase in the acid concentration as explained heretofore, and to maintain the acid concentration within the limit of about 1% to about 2% sulphuric acid.

By my novel processes a zinc sulphate crystal is obtained having a lower chlorine to zinc ratio than the original zinc crudes from which it was produced. The chlorine content of the zinc crudes to some extent, of course, determines the chlorine content of the zinc sulphate obtainable, but this is true to a lesser degree than in the other processes heretofore known to the art.

It is necessary, in the processes of my invention, to control the acidity of the zinc sulphate solution during concentration. If the solution is not sufficiently acid, the chlorine removal is reduced and the crystal obtained is basic. If the solution is too acidic, on the other hand, an acid crystal is obtained. I prefer to maintain the solution at an acidity of from about 1 to 2% as sulphuric acid. The acidity of 1.4% used in Example II was, of course, satisfactory under the conditions of this example.

Any suitable apparatus may be used for concentrating zinc sulphate liquors according to my novel processes. This step was conveniently accomplished in the cone-bottomed tank and salt lock used in Example II, but numerous other means for accomplishing the purpose could have been employed.

The amount of mother liquor adhering to the crystal as it is dried has an important bearing on the chloride content of the final product, as has already been pointed out. I prefer to dry the crystal with from about 15 to 30% of its weight of mother liquor. I can conveniently secure such a mixture of crystal and mother liquor by a properly controlled centrifuging operation, as in Example II, but other means for obtaining the proper mixture may, of course, be used.

I claim:

1. In a process for producing zinc sulphate monohydrate, the steps comprising concentrating a zinc sulphate solution by evaporation while maintaining its acidity at about from 1% to about 2% as sulphuric acid, crystallizing zinc sulphate monohydrate out of the saturated zinc sulphate solution, and separating and drying the zinc sulphate monohydrate crystal together with from about 15 to 30% of its weight of the saturated solution.

2. A process for producing zinc sulphate monohydrate having a basicity not greater than about 0.06% as zinc oxide and having a lower ratio of chloride to zinc than the zinc-containing crudes from which it was produced, which comprises dissolving the zinc out of the crudes with sulphuric acid, mechanically removing insoluble residues, concentrating the zinc sulphate solution by evaporation while maintaining its acidity at about from 1% to about 2% as sulphuric acid, crystallizing zinc sulphate monohydrate out of the saturated zinc sulphate solution, and separating and drying the zinc sulphate monohydrate crystal together with from about 15 to 30% of its weight of the saturated solution.

IVAN L. HAAG.